(12) United States Patent
Choi

(10) Patent No.: US 7,652,627 B2
(45) Date of Patent: Jan. 26, 2010

(54) SYSTEM FOR PROVIDING GPS INFORMATION INDOORS AND METHOD OF ACQUIRING INDOOR GPS INFORMATION BY MOBILE DEVICE

(75) Inventor: Hyong-uk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 11/507,566

(22) Filed: Aug. 22, 2006

(65) Prior Publication Data

US 2007/0040742 A1  Feb. 22, 2007

(30) Foreign Application Priority Data

Aug. 22, 2005  (KR) ............... 10-2005-0076966

(51) Int. Cl.
*G01S 1/02* (2006.01)
*G01S 3/02* (2006.01)

(52) U.S. Cl. ............... 342/450; 342/357.06; 342/457

(58) Field of Classification Search ........... 342/357.02, 342/357.06, 357.13, 357.15, 450, 457, 357.12, 342/465; 701/207, 213, 215; 455/456.1
See application file for complete search history.

(56) References Cited

U.S. PATENT DOCUMENTS

| | | | |
|---|---|---|---|
| 6,084,547 A * | 7/2000 | Sanderford et al. ......... 342/457 |
| 6,700,535 B2 | 3/2004 | Gilkes | |
| 2004/0108954 A1* | 6/2004 | Richley et al. ............. 342/387 |
| 2005/0288033 A1* | 12/2005 | McNew et al. ........... 455/456.1 |
| 2008/0129591 A1* | 6/2008 | Lamance et al. ........ 342/357.12 |
| 2008/0304601 A1* | 12/2008 | Abraham et al. ............ 375/340 |
| 2008/0309550 A1* | 12/2008 | Sairo et al. .............. 342/357.1 |

FOREIGN PATENT DOCUMENTS

| | | |
|---|---|---|
| JP | 2003-274441 | 9/2003 |
| JP | 2003-299138 | 10/2003 |

* cited by examiner

*Primary Examiner*—Dao L Phan
(74) *Attorney, Agent, or Firm*—Stein McEwen, LLP

(57) ABSTRACT

A system for providing position information by using a wireless personal area network (WPAN), and a method of acquiring the position information of a mobile device thereof where the system includes: a first node including referenced position information; and a plurality of second nodes calculating their respective position information based on the reference position information of the first node, wherein the mobile device calculates its position information by using the reference position information received from the first node and/or one or more of the respective position information of the second nodes. According to the system and method, at an indoor place where a global positioning system (GPS) signal is weak or absent, the GPS position information can be acquired through the position information providing system using a low-price wireless LAN communication network.

20 Claims, 2 Drawing Sheets

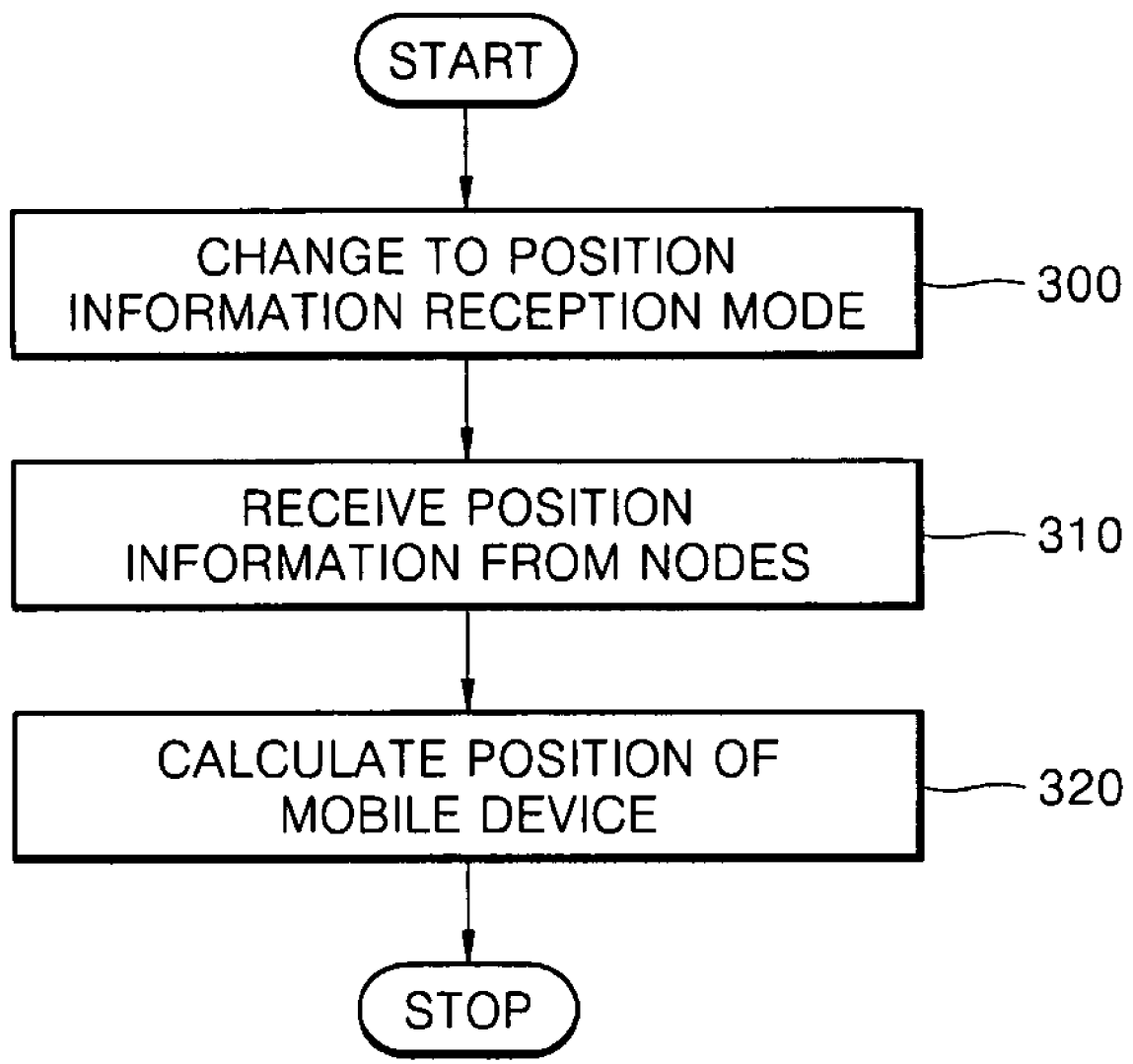

SYSTEM FOR PROVIDING GPS INFORMATION INDOORS AND METHOD OF ACQUIRING INDOOR GPS INFORMATION BY MOBILE DEVICE

CROSS-REFERENCE TO RELATED APPLICATION

This application claims the benefit of Korean Application No. 2005-76966, filed on Aug. 22, 2005 in the Korean Intellectual Property Office, the disclosure of which is incorporated herein by reference.

BACKGROUND OF THE INVENTION

1. Field of the Invention

The present invention relates to providing global positioning system (GPS) position information, and more particularly, to a system and method of providing position information by using a wireless network such as a wireless personal area network (WPAN).

2. Description of the Related Art

A GPS is a system providing positioning, speed, and time information services by using satellites. The GPS can accurately provide 3-dimensional position, altitude, and time information services and can provide such services continuously for 24 hours a day. The GPS has several advantages in that the information services are robust against weather conditions, interference, and interruption, and a common coordinate system can be utilized around the world. A user can get accurate position information by simply installing a dedicated receiver in the same manner as a conventional radio navigation system.

Typically, a GPS signal has a low energy density because such a GPS signal is transmitted from a satellite and is spread over a wide area. Since an antenna receiving the GPS signal is omni-directional, it is difficult to expect an antenna gain of the GPS signal for the antenna. Furthermore, the frequency of the GPS signal is equal to or higher than 1 GHz, and attenuation of the GPS signal becomes greater at a coaxial cable connecting the antenna and a GPS receiver.

In order to correct the attenuation in the GPS signal and to reduce noise in the antenna of the GPS receiver, a low noise amplifier (LNA) with a 20~40dB gain is embedded in the antenna or a frequency conversion circuit that is a part of the GPS receiver is used. However, a power source required inside the antenna or a local oscillation frequency signal for frequency conversion overlaps in the coaxial cable connecting the antenna and the GPS receiver. As a result, antennas other than the specified antenna for the GPS receiver cannot be used in usual cases.

Accordingly, it is almost impossible to receive the GPS signal in a closed space or an indoor place where the GPS signal becomes weak or absent. In order to enable reception of the GPS signal, the performance of the antenna, the low noise amplifier (LNA), and the GPS receiver should be greatly improved. Unfortunately, such hardware improvements can be cost prohibitive.

SUMMARY OF THE INVENTION

Several aspects and embodiments of the present invention provide a system that provides GPS position information to a mobile device, such as a mobile phone or a personal digital assistant (PDA), by using a low-power wireless communication network indoor or at a closed place, and a method of acquiring the GPS position information of such a mobile device.

According to an example embodiment of the present invention, there is provided a position information providing system for providing indoor position information to a mobile device. Such a system comprises: a first node including reference position information; and a plurality of second nodes calculating their respective position information based on the reference position information of the first node, wherein the mobile device calculates its position information by using the reference position information received from the first node and/or one or more of the respective position information of the second nodes.

According to an aspect of the present invention, the first node and the second nodes may be connected through a wireless network such as a wireless personal area network (WPAN). Each of the first node and the second nodes may have a ZigBee apparatus. Each of the second nodes may have a position calculation function in compliance with an IEEE 802.15.4a standard. The reference position information includes global positioning system (GPS) coordinates.

According to another aspect of the present invention, each of the second nodes may calculate the respective position information according to the IEEE 802.15.4a standard, and then, based on the reference position information, may change the respective position information into GPS coordinate data.

According to another aspect of the present invention, a GPS receiver is provided to the first node.

According to another embodiment of the present invention, there is provided a position information acquiring method of a mobile device having an embedded GPS receiver operable in a wireless network having one or more nodes. Such a method comprises: when a GPS signal is too weak or unavailable for the embedded GPS receiver, changing a mode of operating the mobile device so that signals from the one or more nodes of the wireless network are received; and calculating the position of the mobile device based on the signals received from the one or more nodes of the wireless network.

According to an aspect of the present invention, the wireless network may be a wireless personal area network (WPAN). Each of the one or more nodes may have a ZigBee apparatus. The one or more nodes may include a first node and a plurality of second nodes, and the first node includes reference position information and each of the second nodes includes respective position information calculated in compliance with IEEE 802.15.4a standard. The reference position information may include global positioning system (GPS) coordinates.

According to another aspect of the present invention, each of the second nodes may calculate the respective position information according to the IEEE 802.15.4a standard, and then, based on the reference position information, changes the respective position information into GPS coordinates.

According to another aspect of the present invention, the calculation of the position of the mobile device may include: receiving from neighboring nodes their respective position information while the mobile device is moving; detecting the strength of the signal received from each of the one or more nodes; and with respect to the position information of each of the nodes, dividing the coordinate values by the square of the strength of each signal, adding up all the results of the divisions, obtaining the mean value of the sum, and determining the mean value as the current position information.

As a result, the present invention provides a system for providing position information to a mobile device, so that when the mobile device travels indoors, the position information can replace the GPS signal that cannot be easily received indoors.

According to another embodiment of the present invention, a system for determining position information of a mobile device, includes: a reference device containing reference position information; and at least one auxiliary device containing auxiliary position information of the at least one auxiliary device, wherein the auxiliary position information is based on the reference position information, and a relative position information of the mobile device is acquired based on the reference position information and the auxiliary position information.

According to another embodiment of the present invention, a method of determining position information of a mobile device, includes: providing reference position information of a reference device; providing auxiliary position information of at least one auxiliary based on the reference position information; and acquiring a relative position information of the mobile device based on the reference position information and the auxiliary position information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart of a method of acquiring position information by a mobile device with an embedded mobile GPS receiver according to an embodiment of the present invention.

DETAILED DESCRIPTION OF THE EMBODIMENTS

Figure 1:
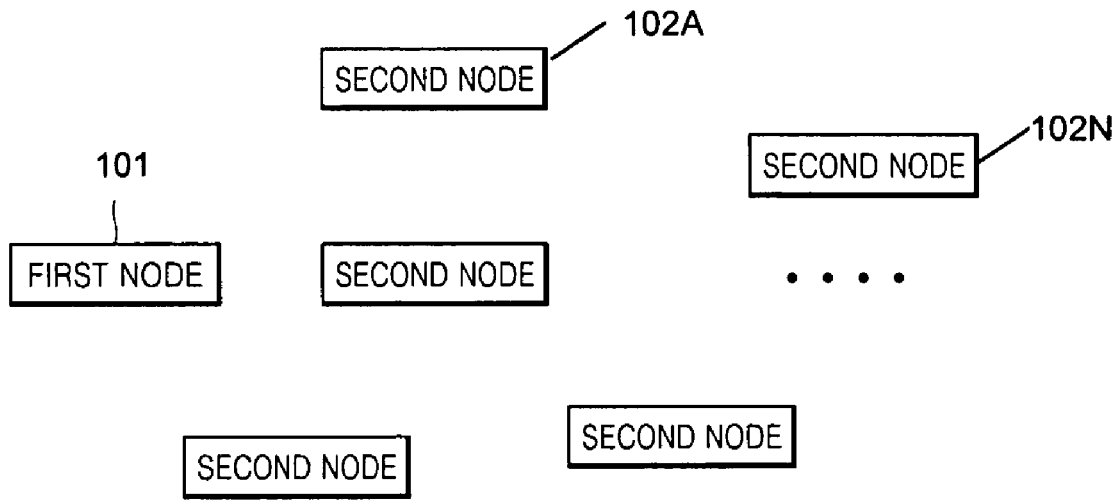
FIG. 1 is a schematic diagram of a position information providing system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram of a position information providing system 100 according to an embodiment of the present invention. As shown in FIG. 1, the position information providing system 100 includes nodes arranged in a service a service area to form a predetermined low-power wireless personal area network (WPAN). A wireless transmission standard characterized by low speed, low price, and low power consumption for use in a wireless integrated remote controller, a consumer electronics controller, building control, and toy control is an IEEE 802.15.4 standard of the WPAN, commenced since July 2000,on which ZigBee is based. Such an IEEE 802.15.4 standard is useful in indoor spaces such as home, offices, and factories, where communications occur over short distances. As shown in FIG. 1, the information providing system 100 includes one or more nodes that are able to communicate with each other and with other devices. These devices may be ZigBee devices such as a ZigBee coordinator, a ZigBee router, and/or a ZigBee end device in compliance with an IEEE 802.15.4a standard. Each of the nodes of FIG. 1 has a ZigBee chip and performs low-powered wireless communication with each other.

Among the nodes shown in FIG. 1, a first node 101 includes reference position information, which may be reference GPS information, such as GPS coordinates, obtained through an external GPS receiver (not shown) or other high performance GPS receivers. Each of the remaining nodes 102A-102N (referred to as second nodes) can calculate its respective position through communication with the first node 101 and other second nodes 102A-102N. The position calculating function of the second nodes 102A-102N is enabled by the IEEE 802.15.4a standard containing a specification for a position recognition function. Once calculated, the position information of each of the second nodes 102A-102N can be converted into GPS coordinates based on the reference position information, including the reference GPS coordinates, from the first node 101.

In FIG. 1, the first node 101 and the second nodes 102A-102N do not need to be stationary, and may move or be moved freely within the service area. If the position of the first node 101 changes, the first node 101 can acquire new reference position information by receiving GPS coordinates from the outside. Additionally, the new reference position may be acquired using the second nodes 102A-102N. That is, based on the initial reference position information of the first node 101, by applying the movement information of the first node 101 obtained through communication with the neighboring second nodes 102A-102N, the first node 101 may modify the initial reference position information, such as the GPS coordinates. Similarly, the second nodes 102A-102N can also newly calculate or otherwise obtain their new position information through communication with neighboring nodes when their positions are changed by movement.

Figure 2:
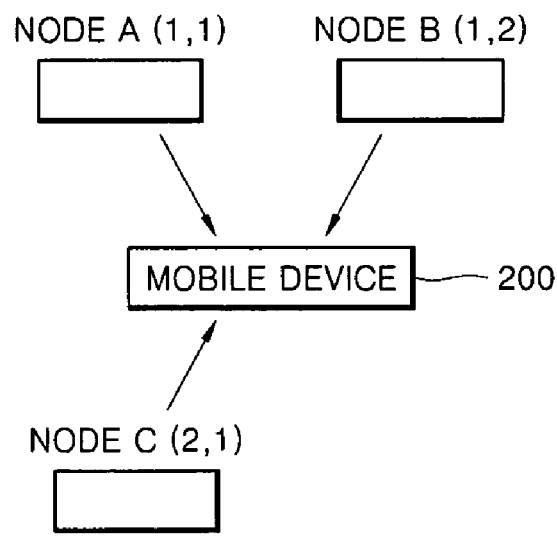
FIG. 2 illustrates an example mobile device traveling in a space where the position information providing system of FIG. 1 is installed receives position information from each node according to an embodiment of the present invention.

FIG. 2 illustrates that a mobile device 200 traveling in a space where the position information providing system 100 as shown in FIG. 1 is installed receives position information from each node according to an embodiment of the present invention.

As shown in FIG. 2, node A, node B, and/or node C, may represent a first node 101 and second nodes 102A-102N as shown in FIG. 1. When the mobile device 200 is positioned or traveling near the node A, node B, and/or node C, the mobile device 200 receives their respective position information from each of the node A, node B, and node C. Such position information may be expressed as GPS coordinates. As an example, node A has coordinate information (1, 1), node B has coordinate information (1, 2), and node C has coordinate information (2, 1). Accordingly, the mobile device 200 receives the coordinate information (1, 1) (1, 2) and (2, 1) from node A, node B, and node C, respectively, and by using the strength (or sensitivities) of each of the received signals as a weight value for the corresponding coordinates, calculates the position of the mobile device 200. For example, assuming that the strength of the signal from node A is L dbm, the strength of the signal from node B is M dbm, and the strength of the signal from node C is N dbm, the position (x, y) of the mobile device 200 can be calculated according to the following equation 1:

$$(x, y) = \frac{1}{3}\left(\frac{1}{L^2}(1, 1) + \frac{1}{M^2}(1, 2) + \frac{1}{N^2}(2, 1)\right) \quad (1)$$

Although expressed as coordinates having two variables, it is understood that coordinates having three variables or more are usable and within the scope of the invention. Also, in calculating the position of the mobile device 200, a variety of methods generally used in this technology field can be applied in addition to the above equation. For example, the positions of the mobile device 200 and the nodes A, B and/or C may be calculated from the distances between the mobile device 200 and each of the nodes A, B, and/or C by determining the time for a signal to travel between them. Using the distance, triangulation may be used to calculate the positions of the mobile device 200 and the nodes A, B, and/or C.

The accuracy of the position (x, y) of the mobile device 200 increases with the increasing density of the nodes, and with the increasing number of nodes A, B, and/or C. However, as long as there is a minimum number of nodes to which the ZigBee standard is applicable, the same accuracy as that of the position information received from an actual GPS receiver can be obtained through the system of the present embodiment. In an example embodiment of the present invention, two or three different nodes may be utilized to form a wireless personal area network (WPAN). However, the present invention is not limited thereto.

FIG. 3 is a flowchart of a method of acquiring position information by a mobile device with an embedded mobile GPS receiver according to an embodiment of the present invention.

When the mobile device 200 cannot receive a GPS signal from the GPS satellites using an embedded GPS receiver, the mobile device 200 internally changes its mode to a position information reception mode at operation 300. That is, the mode of the mobile device 200 is changed so that a signal from the low-powered wireless communication network disposed as shown in FIG. 1 can be received and processed to acquire the position information. Then, the mobile device 200 receives from neighboring nodes their respective position information as shown in FIG. 2 at operation 310. By using the received signals, the mobile device 200 calculates its position information at operation 320, using for example, the equation (1). In an example embodiment, in calculating the position of the mobile device 200, the strength of the signal received from the neighboring nodes as well as the position coordinates of the nodes should be considered.

According to the present invention, in a service area or a place where a GPS signal is too weak or absent such as indoor, building or confined space such as subways, the GPS position information can be acquired through the position information providing system using a low-price wireless LAN communication network.

Accordingly, even in such places, the position of the mobile device 200 can be confirmed to enable the mobile device 200 to be closely linked to a variety of related services, including businesses requiring confirmation of a location, communications, or emergency rescue.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, other wireless networks can also be utilized, such as Wi-Fi networks, Bluetooth, ultra-wideband networks, and compatible wireless application protocols usable for wireless transmission as specified by IEEE 802.11(a), (b) and/or (g) standards, Bluetooth standards and other emerging wireless personal area networks such as Wi-Max in which service coverage areas can be extended up-to 30 miles. As a result, the present invention can be applicable to other wireless networks and compatible communication protocols. Also, a mobile device 200 may be a portable electronic device, such as a cell phone, laptop computer, PDA, game consoles, or the like. Furthermore, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Accordingly, it is intended, therefore, that the present invention not be limited to the various example embodiments disclosed, but that the present invention includes all embodiments falling within the scope of the appended claims.

What is claimed is:

1. A position information providing system for providing position information to a mobile device, the system comprising:

a first node including reference position information; and a plurality of second nodes calculating their respective position information based on the reference position information of the first node, wherein, the mobile device having an embedded GPS receiver starts receiving signals from the first node and/or the plurality of second nodes when the mobile device is not able to receive a GPS signal with the embedded GPS receiver, and calculates the position of the mobile device based on the signals received from the first node and/or the plurality of second nodes.

2. The system of claim 1, wherein the first node and the second nodes are connected through a wireless personal area network (WPAN).

3. The system of claim , wherein each of the first node and the second nodes has a ZigBee apparatus.

4. The system of claim 1, wherein each of the second nodes has a position calculation function in compliance with an IEEE 802.15.4a standard.

5. The system of claim 1, wherein the reference position information includes global positioning system (GPS) coordinates.

6. The system of claim 4, wherein each of the second nodes calculates the respective position information according to the IEEE 802.15.4a standard, and then, based on the reference position information, changes the respective position information into GPS coordinates.

7. The system of claim 1, further comprising a GPS receiver arranged at the first node to provide GPS coordinates to the first node.

8. A position information acquiring method of a mobile device having an embedded GPS receiver operable in a wireless network having one or more nodes, the method comprising:
   when a GPS signal is too weak or unavailable for the embedded GPS receiver, changing a mode of operating the mobile device so that signals from the one or more nodes of the wireless network are received; and
   calculating the position of the mobile device based on the signals received from the one or more nodes of the wireless network.

9. The method of claim 8, wherein the wireless network is a wireless personal area network (WPAN).

10. The method of claim 8, wherein each of the one or more nodes has a ZigBee apparatus.

11. The method of claim 9, wherein the one or more nodes include a first node and a plurality of second nodes, and the first node includes reference position information and each of the second nodes includes respective position information calculated in compliance with an IEEE 802.15.4a standard.

12. The method of claim 11, wherein the reference position information includes global positioning system (GPS) coordinates.

13. The method of claim 11, wherein each of the second nodes calculates the respective position information according to the IEEE 802.15.4a standard, and then, based on the reference position information, changes the respective position information into GPS coordinates.

14. The method of claim 8, wherein the calculation of the position of the mobile device comprises:
   receiving from neighboring nodes their respective position information while the mobile device is moving;
   detecting the strength of the signal received from each of the one or more nodes; and
   with respect to the position information of each of the nodes, dividing the coordinate values by the square of the strength of each signal, adding up all the results of the divisions, obtaining the mean value of the sum, and determining the mean value as the current position information.

15. A system for determining position information of a mobile device, comprising:
   a reference device containing reference position information; and
   at least one auxiliary device containing auxiliary position information obtained based on the reference position information,
   wherein, the mobile device having an embedded GPS receiver starts receiving signals from the reference device and/or the at least one auxiliary device when the mobile device is not able to receive a GPS signal with the embedded GPS receiver, and calculates the position of the mobile device based on the signals received from the reference device and/or the at least one auxiliary device.

16. The system of claim 15, wherein the reference and the auxiliary devices are ZigBee apparatuses.

17. The system of claim 15, wherein the system complies with the IEEE 802.15.4a standard.

18. A method of determining position information of a mobile device, comprising:
   providing reference position information of a reference device;
   providing auxiliary position information of at least one auxiliary device based on the reference position information,
   wherein, the mobile device having an embedded GPS receiver starts receiving signals from the reference device and/or the at least one auxiliary device when the mobile device is not able to receive a GPS signal with the embedded GPS receiver, and calculates the position of the mobile device based on the signals received from the reference device and/or the at least one auxiliary device.

19. The method of claim 18, wherein the reference and the auxiliary devices are ZigBee apparatuses.

20. The method of claim 18, wherein the communication signals between the reference and auxiliary devices comply with an IEEE 802.15.4a standard.

* * * * *

UNITED STATES PATENT AND TRADEMARK OFFICE
CERTIFICATE OF CORRECTION

| | | |
|---|---|---|
| PATENT NO. | : 7,652,627 B2 | Page 1 of 1 |
| APPLICATION NO. | : 11/507566 | |
| DATED | : January 26, 2010 | |
| INVENTOR(S) | : Hyong-Uk Choi | |

It is certified that error appears in the above-identified patent and that said Letters Patent is hereby corrected as shown below:

Column 6, Line 51, change "claim ," to --claim 1,--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.       : 7,652,627 B2
APPLICATION NO.  : 11/507566
DATED            : January 26, 2010
INVENTOR(S)      : Hyong-uk Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twenty-eighth Day of December, 2010

David J. Kappos
*Director of the United States Patent and Trademark Office*